(12) United States Patent
Chung et al.

(10) Patent No.: US 7,760,311 B2
(45) Date of Patent: Jul. 20, 2010

(54) LIQUID CRYSTAL DISPLAY DEVICE AND MANUFACTURING METHOD THEREOF

(75) Inventors: Chae Woo Chung, Cheonan-si (KR); Sung Jae Moon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 681 days.

(21) Appl. No.: 11/622,254

(22) Filed: Jan. 11, 2007

(65) Prior Publication Data
US 2007/0182902 A1    Aug. 9, 2007

(30) Foreign Application Priority Data
Feb. 3, 2006    (KR) .................. 10-2006-0010349

(51) Int. Cl.
*G02F 1/1343* (2006.01)
(52) U.S. Cl. .................. 349/144; 349/85; 349/38; 349/139; 349/43; 345/695; 345/694

(58) Field of Classification Search .................. 349/139, 349/144, 85, 187, 38, 43, 141, 143, 84; 345/149, 345/694, 695
See application file for complete search history.

(56) References Cited

U.S. PATENT DOCUMENTS 6,956,553 B2 * 10/2005 Tsutsui et al. .................. 345/94

* cited by examiner

*Primary Examiner*—Thoi V Duong
(74) *Attorney, Agent, or Firm*—Cantor Colburn LLP

(57) ABSTRACT

A liquid crystal display (LCD) device and a manufacturing method thereof, capable of preventing vertical crosstalk caused by a deviation of a parasitic capacitance, includes a first pixel electrode formed in a first gray scale region of each subpixel region divided into first and second gray scale regions, and a second pixel electrode formed in the second gray scale region separated from the first pixel electrode and encompassed by the first pixel electrode.

27 Claims, 16 Drawing Sheets

LIQUID CRYSTAL DISPLAY DEVICE AND MANUFACTURING METHOD THEREOF

This application claims priority to Korean Patent Application No. 2006-10349, filed on Feb. 3, 2006, and all the benefits accruing therefrom under 35 U.S.C. §119, and the contents of which in its entirety are hereby incorporated by reference.

BACKGROUND OF THE INVENTION

1. Field of the Invention

The present invention relates to a liquid crystal display ("LCD") device, and more particularly, to an LCD device and a manufacturing method thereof, capable of preventing vertical crosstalk caused by a deviation of a parasitic capacitance.

2. Description of the Related Art

An LCD device displays an image by using the electro-optical properties of liquid crystals disposed between electrodes of an LCD panel. The LCD device includes the LCD panel for displaying an image through a pixel matrix using liquid crystals, a driving circuit for driving the LCD panel, and a backlight unit for irradiating light to the LCD panel. An optical viewing technology has been developed to overcome limitations of a viewing angle of an image on a screen of the LCD device, because the image may appear to be distorted depending on a position of a viewer viewing the screen.

A multi-domain vertical alignment (VA) mode is used as a typical optical viewing technology of the LCD device. In the multi-domain VA mode, each subpixel is split into multiple domains having different alignment directions of liquid crystal molecules to mutually compensate for a variation of transmittance, thereby optimizing an optical viewing angle. A patterned vertical alignment (PVA) mode is primarily used for forming a multi-domain by a fringe field caused by slits of a common electrode and a pixel electrode. In the PVA mode, however, the alignment of the liquid crystal molecules may be dispersed due to a lateral field generated at edges of a subpixel, thus lowering lateral visibility.

Recently, a method has been proposed for improving visibility by splitting each subpixel having a multi-domain into two regions driven by different voltages and mixing gray scales of the two regions. However, since a deviation of right and left parasitic capacitances occurs due to the difference in length between the data lines of both sides and adjacent pixel electrodes caused by splitting each subpixel, there is picture degradation such as vertical crosstalk.

BRIEF SUMMARY OF THE INVENTION

The present invention thus provides an LCD device and a manufacturing method thereof, capable of preventing vertical crosstalk caused by a deviation of a parasitic capacitance.

In accordance with an exemplary embodiment of present invention, an LCD device includes a first pixel electrode formed in a first gray scale region of each subpixel region divided into first and second gray scale regions, and a second pixel electrode formed in the second gray scale region separated from the first pixel electrode and encompassed by the first pixel electrode. The LCD device further includes a first thin film transistor connected to the first pixel electrode, a second thin film transistor connected to the second pixel electrode, and a gate line and a data line connected to the first and second thin film transistors, for defining each subpixel region. The LCD device may further include a thin film transistor connected to the second pixel electrode, a coupling capacitor formed at an overlapping part of a drain electrode of the thin film transistor and the first pixel electrode, and a gate line and a data line connected to the thin film transistor, for defining each subpixel region.

The second pixel electrode includes wings symmetrically slanted on the basis of a short side direction of the subpixel region. The first pixel electrode includes an upper electrode formed at an upper part of the second pixel electrode, a lower electrode formed at a lower part of the second pixel electrode, a center electrode formed between the wings of the second pixel electrode, a first connection line for connecting the upper electrode to the center electrode, a second connection line for connecting the lower electrode to the center electrode, and a third connection line for connecting the upper and lower electrodes to each other.

The LCD device further includes a first slit for separating the first and second pixel electrodes from each other. The first slit has a given width along a lateral side of the second pixel electrode and encompasses the second pixel electrode. The LCD device further includes second slits formed at the upper and lower electrodes of the first pixel electrode in parallel with the first slit.

The first and second connection electrodes of the first pixel electrode are formed between the second pixel electrode and a data line adjacent to one side of the second pixel electrode, and the third connection electrode is formed between the second pixel electrode and a data line adjacent to the other side of the second pixel electrode. The third connection electrode reduces the difference in length between one lateral side of the first pixel electrode adjacent to a data line on one side and the other lateral side of the first pixel electrode adjacent to a data line on the other side. An interval between one side of the second pixel electrode and the adjacent data line is identical to that between the other side of the second pixel electrode and the adjacent data line.

The LCD device further includes a storage line formed along a short side direction of the subpixel region and overlapped by the first and second pixel electrodes. The LCD device further includes a first storage capacitor formed such that a first drain electrode extending from the first thin film transistor and connected to the first pixel electrode is overlapped by the storage line with an insulating layer disposed therebetween, and a second storage capacitor formed such that a second drain electrode extending from the second thin film transistor and connected to the second pixel electrode is overlapped by the storage line with the insulating layer disposed therebetween. The LCD device may further include a storage capacitor formed such that the drain electrode extending from the thin film transistor and connected to the second pixel electrode is overlapped by the storage line with a first insulating layer disposed therebetween, wherein the coupling capacitor is formed such that the drain electrode extending from the thin film transistor is overlapped by the first pixel electrode with a second insulating layer disposed therebetween.

The LCD device further includes an organic insulating layer covering the first and second thin film transistors, formed under the first and second pixel electrodes, and a common line formed on the organic insulating layer and overlapped by the gate line and the data line.

In accordance with another exemplary embodiment of the present invention, a method of manufacturing an LCD device includes forming a first pixel electrode formed in a first gray scale region of each subpixel region divided into first and second gray scale regions, and forming a second pixel electrode formed in the second gray scale region separated from the first pixel electrode and encompassed by the first pixel electrode.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE INVENTION

Figure 1:
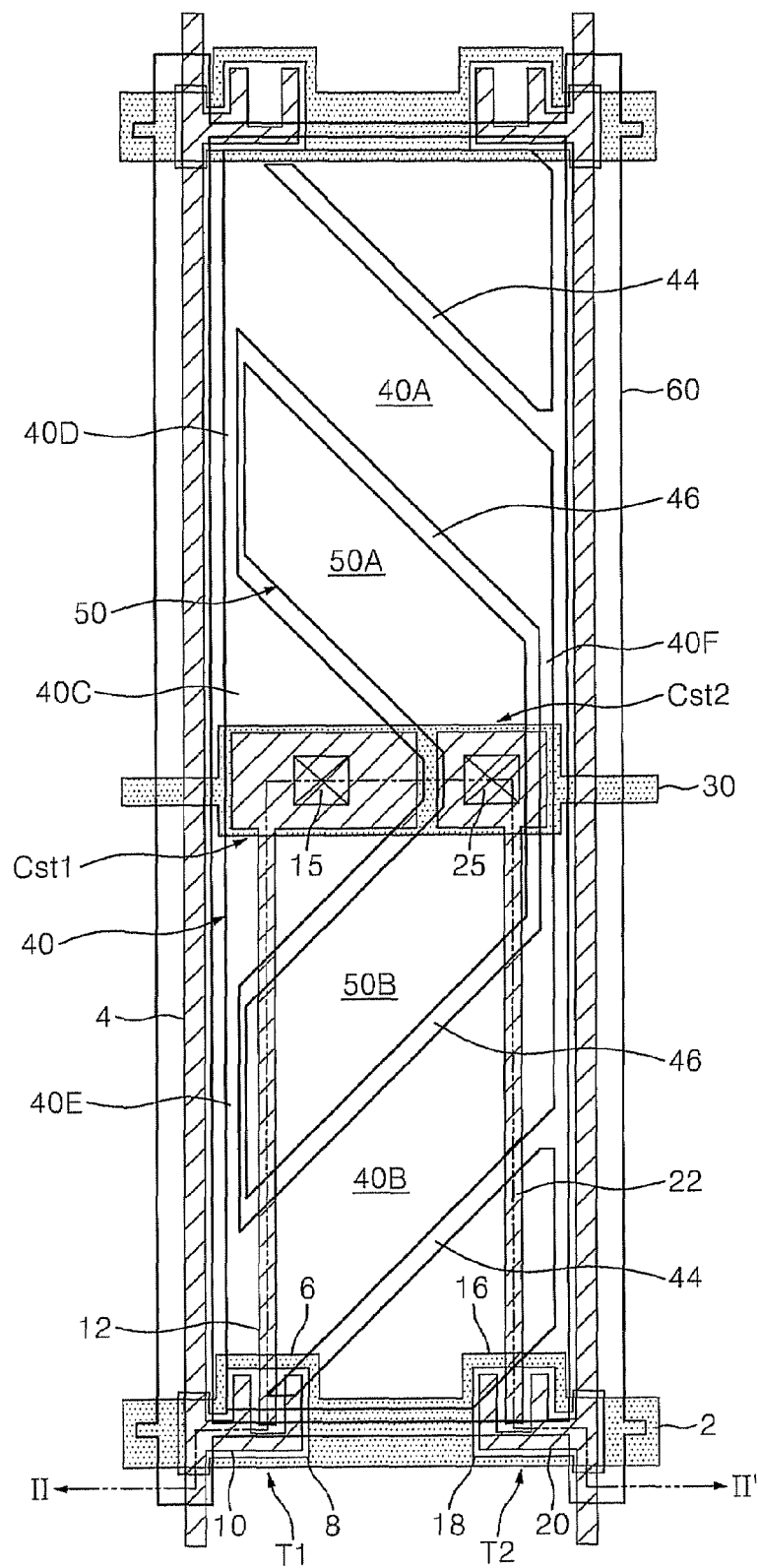
FIG. 1 is a top plan view illustrating a structure of an exemplary embodiment of one subpixel in a thin film transistor ("TFT") substrate of an LCD device according to the present invention.

The invention will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or and below. The device may be otherwise oriented (rotated 90 degrees or at other orientations) and the spatially relative descriptors used herein interpreted accordingly. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The exemplary embodiments of the present invention will now be described with reference to FIGS. 1 to 10.

Figure 2:
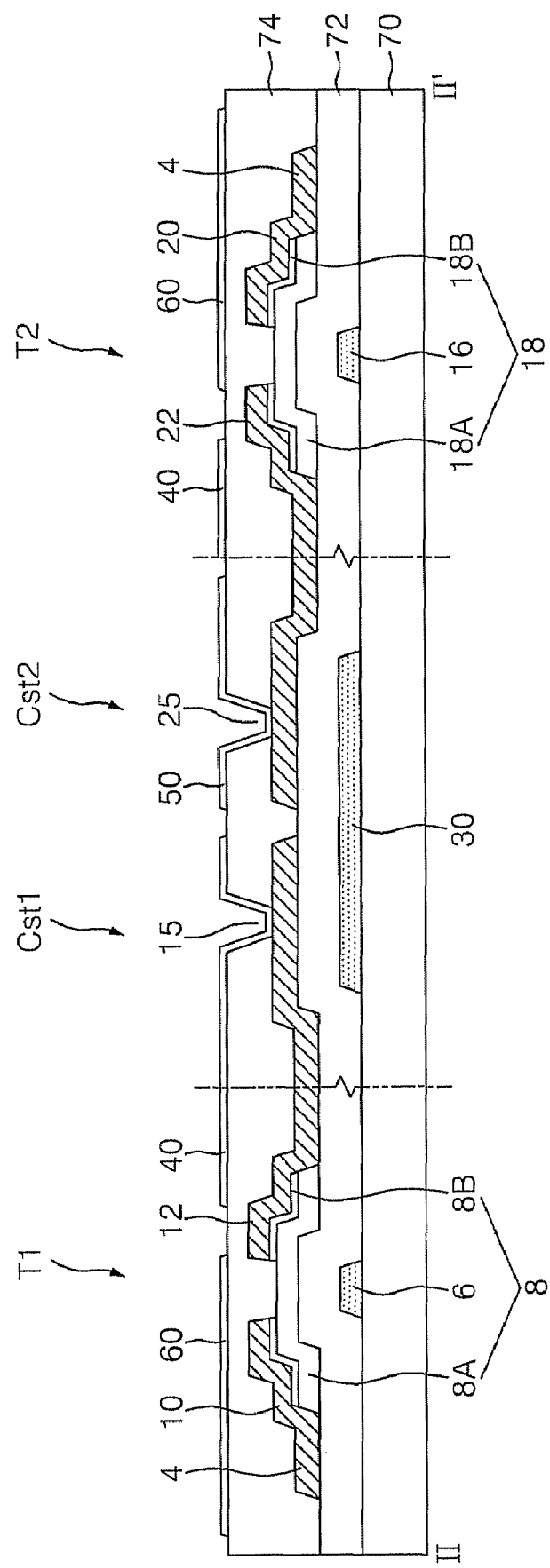
FIG. 2 is a cross-sectional view taken along line II-II' shown in FIG. 1.

FIG. 1 is a top plan view illustrating a structure of an exemplary embodiment of one subpixel in a thin film transistor ("TFT") substrate of an LCD device according to the present invention, and FIG. 2 is a cross-sectional view taken along line II-II' of FIG. 1.

One subpixel shown in FIGS. 1 and 2 includes first and second pixel electrodes 40 and 50 formed independently in a low gray scale region and a high gray scale region, respectively, first and second TFTs T1 and T2 connected independently to the first and second pixel electrodes 40 and 50, respectively, and a gate line 2 and a data line 4 connected to the first and second TFTs T1 and T2.

One subpixel in the TFT substrate shown in FIGS. 1 and 2 is split into a high gray scale region and a low gray scale region to which different data signals are applied in order to improve visibility. The first and second pixel electrodes 40 and 50 are independently formed in each subpixel to define the low and high gray scale regions, respectively. The first and second pixel electrodes 40 and 50 are respectively driven by the first and second TFTs T1 and T2 and receive different data signals. The gate line 2 and the data line 4 are formed on an insulating substrate 70 to cross each other with a gate insulating layer 72 disposed therebetween. Each subpixel region is defined by the crossing structure of the gate line 2 and the data line 4. A storage line 30 is formed on the insulating substrate 70 in parallel with the gate line 2. The storage line 30 passes through the center of the subpixel in a short side direction (e.g., horizontal direction as illustrated in FIG. 1) thereof and crosses the data line 4 with the gate insulating layer 72 disposed therebetween.

The first and second TFTs T1 and T2 respectively include gate electrodes 6 and 16 connected to the gate line 2, source electrodes 10 and 20 connected to the data line 4, drain electrodes 12 and 22 connected respectively to the first and second pixel electrodes 40 and 50, and semiconductor layers 8 and 18 connected respectively to the source electrodes 10 and 20 and to the drain electrodes 12 and 22. The semiconductor layers 8 and 18 respectively include active layers 8A and 18A for forming a channel between the source electrodes 10 and 20 and the drain electrodes 12 and 22, and ohmic contact layers 8B and 18B for ohmic contact between the active layers 8A and 18A, and the source electrodes 10 and 20 and the drain electrodes 12 and 22.

The first and second pixel electrodes 40 and 50 are formed on an organic insulating layer 74 covering the TFTs T1 and T2 and connected respectively to the drain electrodes 12 and 22 of the first and second TFTs T1 and T2 through first and second contact holes 15 and 25 penetrating the organic insulating layer 74. An inorganic insulating layer may be additionally formed on and/or under the lower part of the organic insulating layer 74. A common line 60 overlaps the data line 4 and gate line 2 and is formed on the organic insulating layer 74. The common line 60 has a line width wider than a line width of the data line 4 and narrower than a line width of the gate line 2. A common voltage identical to or similar to a voltage supplied to a common electrode (not shown) of an upper substrate is applied to the common line 60. Therefore, neither an electric field nor a weak electric field is formed between the common line 60 and the common electrode of the upper substrate and VA liquid crystal molecules are not driven therebetween, thereby preventing light leakage.

The first pixel electrode 40 is formed in a low gray scale region of each subpixel region and the second pixel electrode 50 is formed in a high gray scale region thereof. It is preferable that the high and low gray scale regions of each subpixel are split having a ratio of 1:2, which is an optimal ratio for improving visibility. Therefore, each subpixel region is divided into 3 regions, two regions for the low gray scale region where the first pixel electrode 40 is formed, and one region for the high gray scale region where the second pixel electrode 50 is formed.

The drain electrodes 12 and 22 of the first and second TFTs T1 and T2 extend to the center of the subpixel in which the storage line 30 is formed and are connected respectively to the first and second pixel electrodes 40 and 50 through the first and second contact holes 15 and 25 overlapping the storage line 30 (see FIG. 2). The drain electrodes 12 and 22 of the first and second TFTs T1 and T2 overlap the storage line 30 with the gate insulating layer 72 interposed therebetween, thus forming first and second storage capacitors Cst1 and Cst2, respectively.

The second pixel electrode 50 of the high gray scale region has a structure having upper and lower wings 50A and 50B symmetrically slanted on the basis of the short side direction of each subpixel region, i.e., symmetric relative to the storage line 30. In other words, the upper and lower wings 50A and 50B of the second pixel electrode 50 form a "V" shape rotated by 90 degrees counterclockwise. The first pixel electrode 40 of the low gray scale region is formed to be located at upper and lower parts of each subpixel region divided by the second pixel electrode 50 and at a center part between the wings 50A and 50B of the second pixel electrode 50 and has a symmetrical structure relative to the storage line 30. Namely, the first pixel electrode 40 of the low gray scale region includes an upper electrode 40A positioned at the upper part of the second pixel electrode 50, a lower electrode 40B positioned at the lower part of the second pixel electrode 50, and a center electrode 40C positioned between the wings 50A and 50B thereof. The first pixel electrode 40 also includes a first connection electrode 40D for connecting the upper electrode 40A to the center electrode 40C, a second connection electrode 40E for connecting the lower electrode 40B to the center electrode 40C, and a third connection electrode 40F for connecting the upper and lower electrodes 40A and 40B to each other.

A first slit 46 having a given width is formed between the first and second pixel electrodes 40 and 50. Second slits 44 having a given width are formed in parallel with the first slit 46 in the upper and lower electrodes 40A and 40B of the first pixel electrode 40 of the low gray scale region. The first slit 46 between the first and second pixel electrodes 40 and 50 encompasses a lateral side of the second pixel electrode 50. Namely, since the first slit 46 is formed having a given width along the lateral side of the second pixel electrode 50, the first slit 46 has an angle that is symmetrically slanted about the storage line 30, like the second pixel electrode 50. Since the second slits 44 formed in the upper and lower electrodes 40A and 40B of the first pixel electrode 40 are also parallel with a part of the first slit 46, the second slits 44 have an angle symmetrically slanted about the storage line 30. The first slit 46 separates the first and second pixel electrodes 40 and 50 from each other. The first and second slits 46 and 44 cause the first and second pixel electrodes 40 and 50 to form a fringe field together with a common electrode formed on an upper substrate (not shown). Therefore, liquid crystal molecules are symmetrically aligned on the basis of the first and second slits 46 and 44 and a multi-domain is formed. To form many more domains, common electrode slits may be formed in parallel in the common electrode of the upper substrate in a crossing structure with the first and second slits 46 and 44.

The first connection electrode 40D connecting the upper electrode 40A of the first pixel electrode 40 to the center electrode 40C thereof and the second connection electrode 40E connecting the lower electrode 40B to the center electrode 40C are formed at a space between the left data line 4 and the second pixel electrode 50. The third connection electrode 40F is formed at a space between the second pixel electrode 50 and the right data line 4. The first and second connection electrodes 40D and 40E connect the center electrode 40C of the first pixel electrode 40 to the upper and lower electrodes 40A and 40B thereof, respectively, through a space between the left data line 4 and one lateral side of the second pixel electrode 50 parallel with the left data line 4. The third connection electrode 40F connects the upper electrode 40A of the first pixel electrode 40 to the lower electrode 40B thereof through a space between the right data line 4 and the other lateral side of the second pixel electrode 50 parallel with the right data line 4. The first to third connection electrodes 40D, 40E and 40F have the same line width. The third connection electrode 40F serves to reduce a deviation of right and left parasitic capacitances Cds_R and Cds_L formed between the first and second pixel electrodes 40 and 50 and right and left data lines 4, thus preventing vertical crosstalk.

Figure 3A:
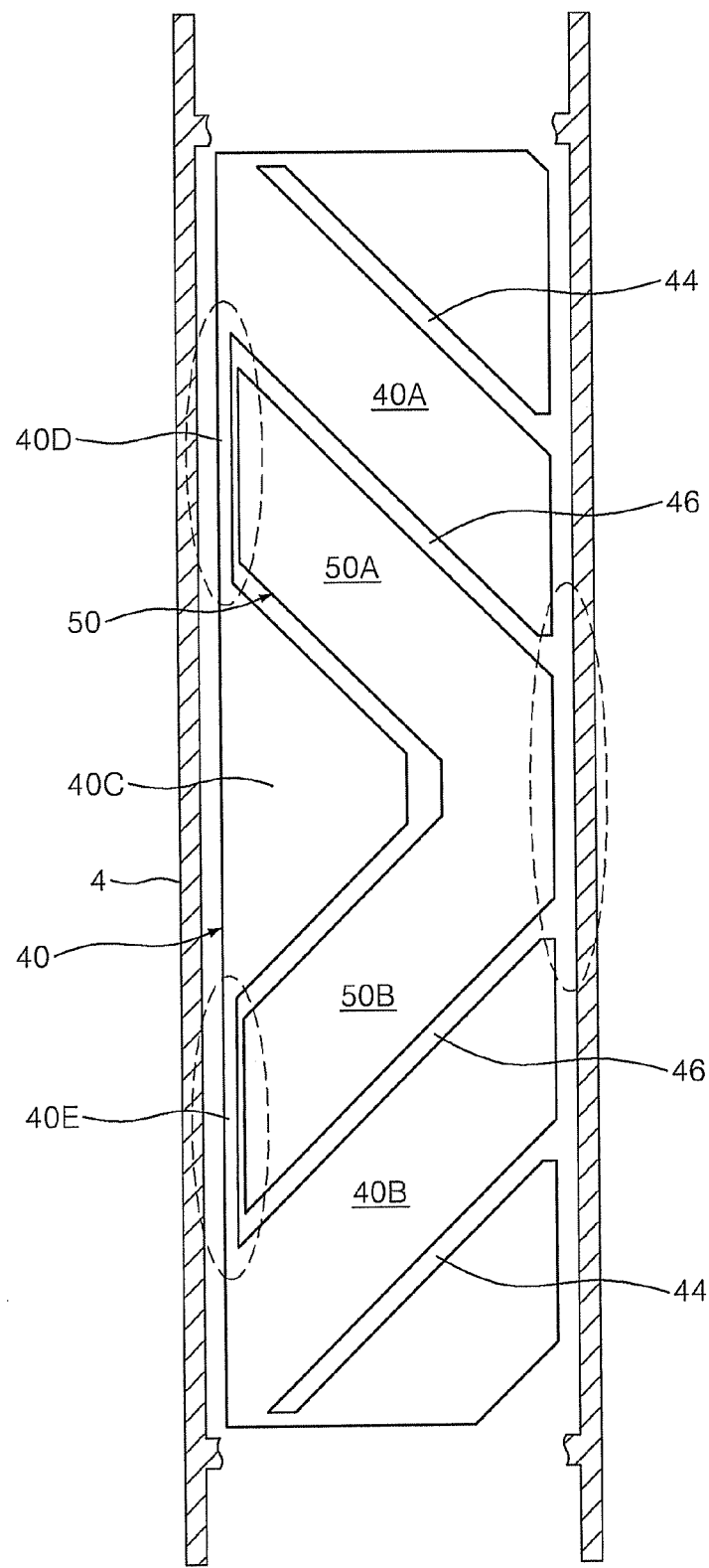
FIGS. 3A and 3B are top plan views for describing parasitic capacitances of a first pixel electrode in a structure without and with a third connection electrode, respectively.

As illustrated in FIG. 3A, if there is no third connection electrode 40F of the first pixel electrode 40, the left lateral side of the first pixel electrode 40 adjacent to the left data line 4 becomes longer than the right lateral side thereof adjacent to the right data line 4 as evidenced by a length of the first and second connection electrodes 40D and 40E. Due to the difference in length between the right and left lateral sides of the first pixel electrode 40, a deviation of parasitic capacitance occurs between the left parasitic capacitance Cds_L between the first pixel electrode 40 and the left data line 4, and the right parasitic capacitance Cds_R between the first pixel electrode 40 and the right data line 4. Moreover, an interval between the left data line 4 and the second pixel electrode 50 is wider than that between the right data line 4 and the second pixel electrode 50 by the first and second connection electrodes 40D and 40E of the first pixel electrode 40. Therefore, a deviation of parasitic capacitance occurs between the left parasitic capacitance Cds_L between the second pixel electrode 50 and the left data line 4, and the right parasitic capacitance Cds_R between the second pixel electrode 50 and the right data line 4. As a result, if data signals of opposite polarity are applied to the right and left data lines 4 for polarity inversion, a coupling value of the parasitic capacitances Cds_L and Cds_R distorting data signals charged to the first and second pixel electrodes 40 and 50 is not compensated for due to the deviation of the parasitic capacitances Cds_L and Cds_R, and thus induces the vertical crosstalk. In the case of column inversion driving in which the polarity is inverted on a data line basis, the deviation of the capacitances Cds_L and Cds_R is increased and the vertical crosstalk becomes more severe. This is because a variation $\Delta Vp$ of a voltage charged to each subpixel inducing the vertical crosstalk is proportional to the deviation of the right and left capacitances Cds_R and Cds_L.

For example, the voltage variation $\Delta Vp$ of one subpixel caused by the right and left data lines 4 is expressed as a sum of a voltage variation $\Delta Vp\_L$ caused by the left data line and a voltage variation $\Delta Vp\_R$ by the right data line:

$$\Delta Vp = \Delta Vp\_L + \Delta Vp\_R$$

$$\Delta Vp\_L = Cds\_L \times \Delta Vdata\_L / Ctotal$$

$$\Delta Vp\_R = Cds\_R \times \Delta Vdata\_R / Ctotal \quad \text{(Equation 1)}$$

where $\Delta Vdata\_L$ is a variation of a data signal supplied to the left data line, $\Delta Vdata\_R$ is a variation of a data signal supplied to the right data line, and Ctotal is a total capacitance (e.g., Clc+Cst+Cds_L+Cds_R) of one subpixel. Assuming that opposite data signals are applied to the right and left data lines, the voltage variation $\Delta Vp$ of one subpixel inducing the vertical crosstalk has a proportional relationship to the deviation (i.e., Cds_L−Cds_R) of the left and right parasitic capacitances as represented by the following Equation 2:

$$\begin{aligned} \Delta Vp &= \{Cds\_L \times \Delta Vdata\_L / Ctotal\} + \\ &\quad \{Cds\_R \times \Delta Vdata\_R / Ctotal\} \\ &= (Cds\_L - Cds\_R) \times \Delta Vdata\_R / Ctotal \end{aligned} \quad \text{(Equation 2)}$$

where $\Delta Vdata\_L = -\Delta Vdata\_R$.

As a result, if the opposite data signals are supplied to the right and left data lines 4 of the first and second pixel electrodes 40 and 50, the vertical crosstalk increases in proportion to the deviation of the right and left parasitic capacitances (i.e., Cds_L−Cds_R).

Figure 3B:
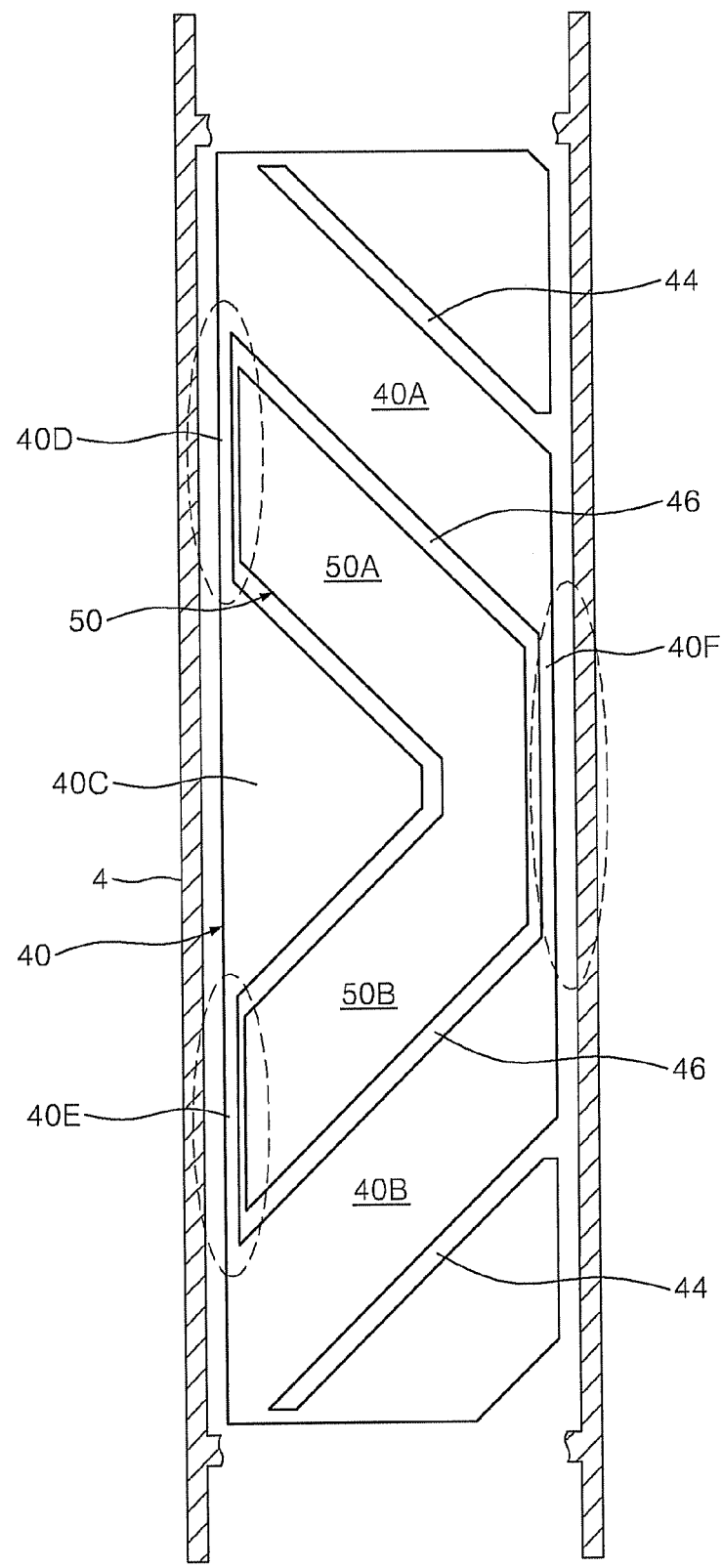

To prevent the vertical crosstalk, an exemplary embodiment of an LCD device according to the present invention includes, as shown in FIG. 3B, the third connection electrode 40F which is adjacent to the right data line 4 and connects the upper and lower electrodes 40A and 40B of the first pixel electrode 40 to each other. Accordingly, the deviation of the left and right parasitic capacitances Cds_L and Cds_R can be minimized. The length of the left lateral side of the first pixel electrode 40 adjacent to the left data line is nearly identical to that of the right lateral side of the first pixel electrode 40 adjacent to the right data line by the third connection electrode 40F. Moreover, an interval between the second pixel electrode 50 and the left data line 4, with the first and second connection electrodes 40D and 40E disposed therebetween is identical to the third connection electrode 40F, that is, by the first pixel electrode 40 encompassing the second pixel electrode 50 to that between the second pixel electrode 50 and the right data line 4, with the third connection electrode 40F disposed therebetween. Hence, the deviation of the left and right parasitic capacitances Cds_L and Cds_R between the first and second pixel electrodes 40 and 50 and the data lines adjacent thereto is minimized and thus the vertical crosstalk can be prevented.

As described above, since each subpixel of an exemplary embodiment of the LCD device according to the present invention has a structure in which the first pixel electrode 40 of the low gray scale region encompasses the second pixel electrode 50 of the high gray scale region, the deviation of the parasitic capacitances between the first and second pixel electrodes 40 and 50 and the data lines 4 on both sides is minimized and thus the vertical crosstalk can be prevented.

A method of manufacturing a TFT substrate of the LCD device according to the present invention will now be described with reference to FIGS. 4A to 8B.

Figure 4A:
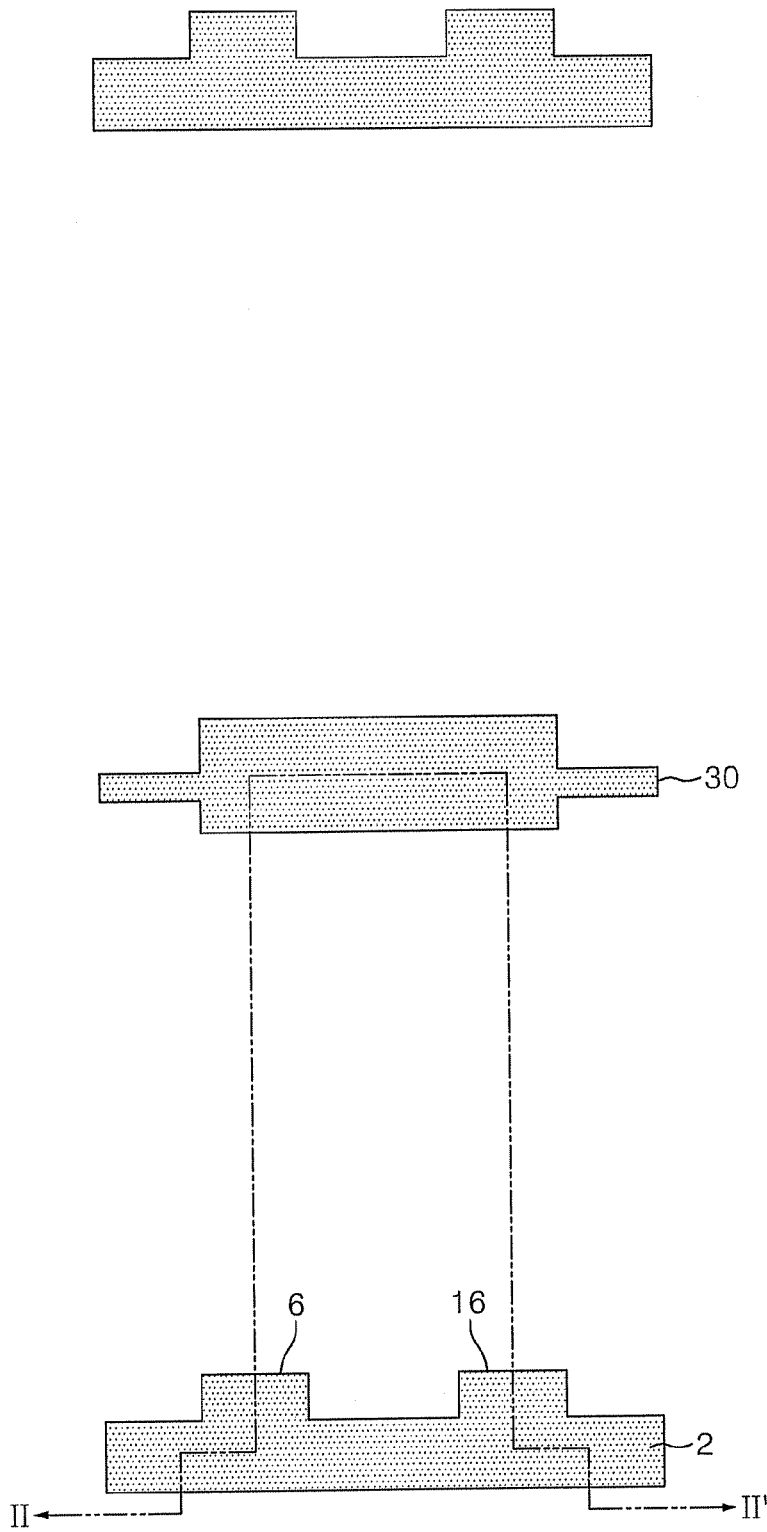
FIGS. 4A and 4B are a top plan view and a cross-sectional view, respectively, for describing an exemplary embodiment of a first mask process of a TFT substrate manufacturing method according to the present invention.
Figure 4B:
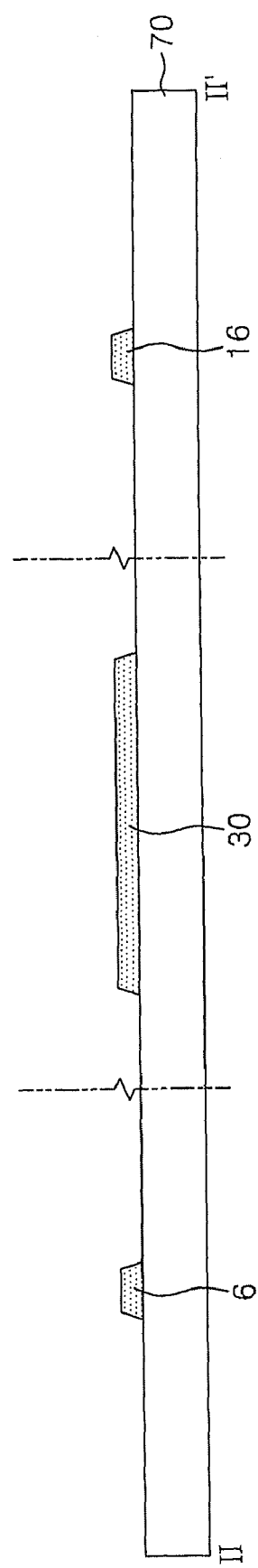

Referring to FIGS. 4A and 4B, a gate metal pattern, including the gate line 2, the gate electrodes 6 and 16 connected to the gate line 2, and the storage line 30 parallel with the gate line 2, is formed on the lower insulating substrate 70 by a first mask process. Specifically, a gate metal layer is formed on the lower insulating substrate 70 through a deposition method, such as sputtering, for example, but is not limited thereto. As the gate metal layer, molybdenum (Mo), aluminum (Al), chrome (Cr), or an alloy of these metals in a single or multi-layered structure is used. Thereafter, the gate metal layer is patterned by photolithographic and etching processes using a first mask (not shown), thereby forming the gate metal pattern including the gate line 2, the gate electrodes 6 and 16, and the storage line 30.

Figure 5A:
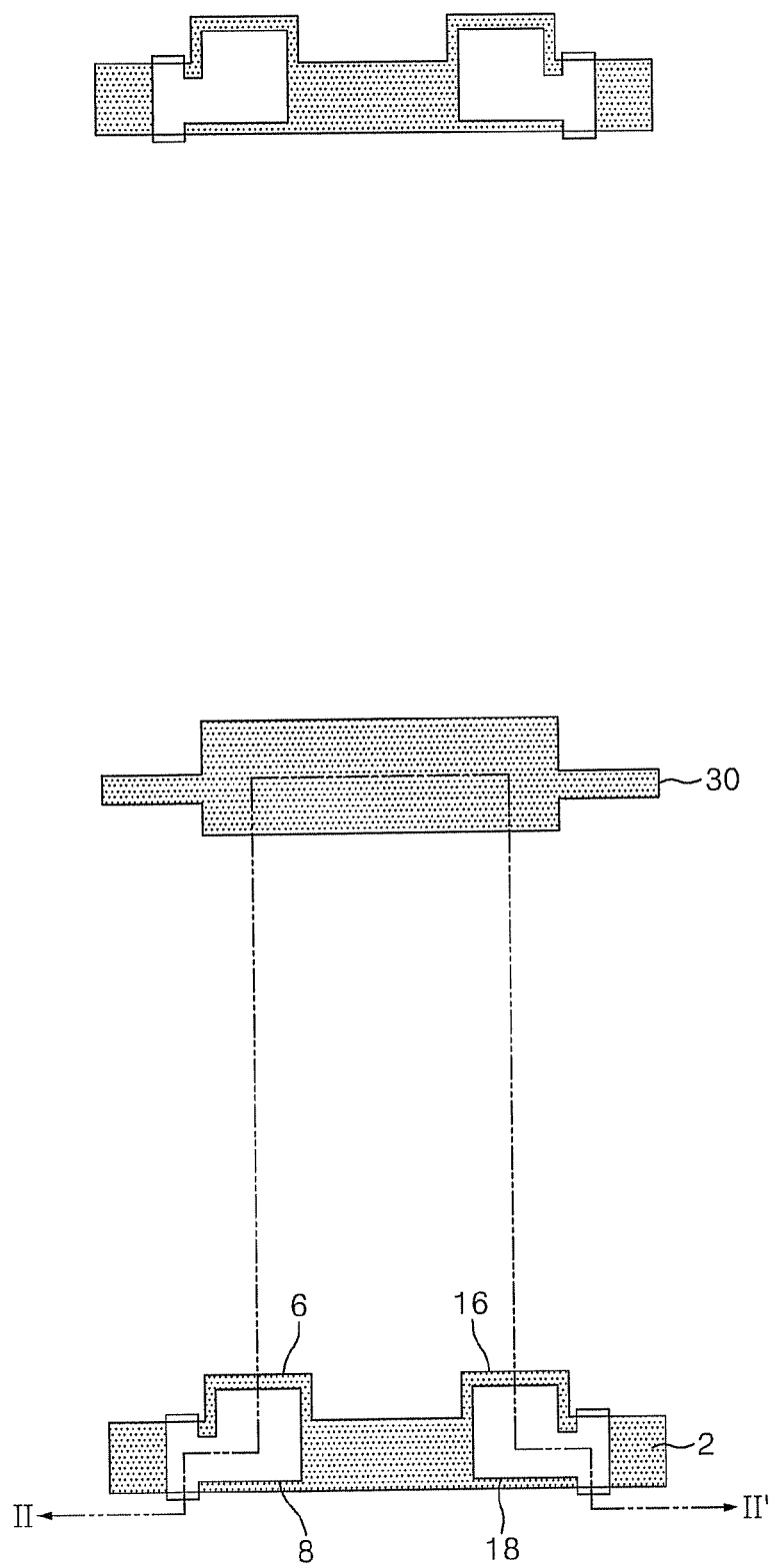
FIGS. 5A and 5B are a top plan view and a cross-sectional view, respectively, for describing an exemplary embodiment of a second mask process of a TFT substrate manufacturing method according to the present invention.
Figure 5B:
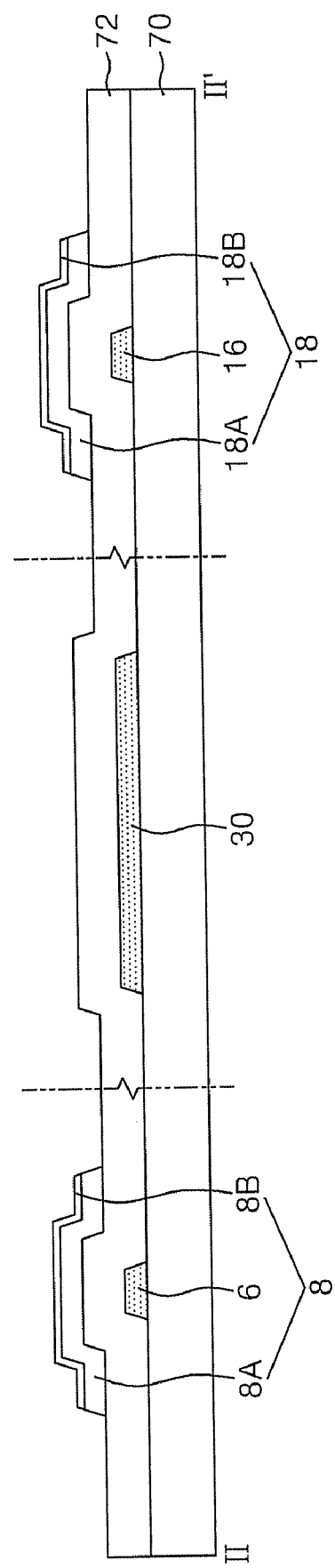

Referring to FIGS. 5A and 5B, the gate insulating layer 72 is formed on the lower insulating substrate 70 on which the gate metal pattern is formed, and the semiconductor layers 8 and 18, including the active layers 8A and 18A and the ohmic contact layers 8B and 18B, are formed on the gate insulating layer 72 by a second mask process to overlap a part of the gate line 2 and the gate electrodes 6 and 16. Specifically, the gate insulating layer 72, an amorphous silicon layer, and an n+ amorphous silicon layer are sequentially formed on the lower insulating substrate 70 on which the gate metal pattern is formed by a deposition method, such as plasma enhanced chemical vapor deposition) ("PECVD"), for example, but is not limited thereto. Next, the n+ amorphous silicon layer and the amorphous silicon layer are patterned by photolithographic and etching processes using a second mask (not shown), thus forming the semiconductor layers 8 and 18 including the active layers 8A and 18A and the ohmic contact layers 8B and 18B. As the gate insulating layer 72, an inorganic insulating material, such as oxide silicon (SiOx) or nitride silicon (SiNx), for example, is used.

Figure 6A:
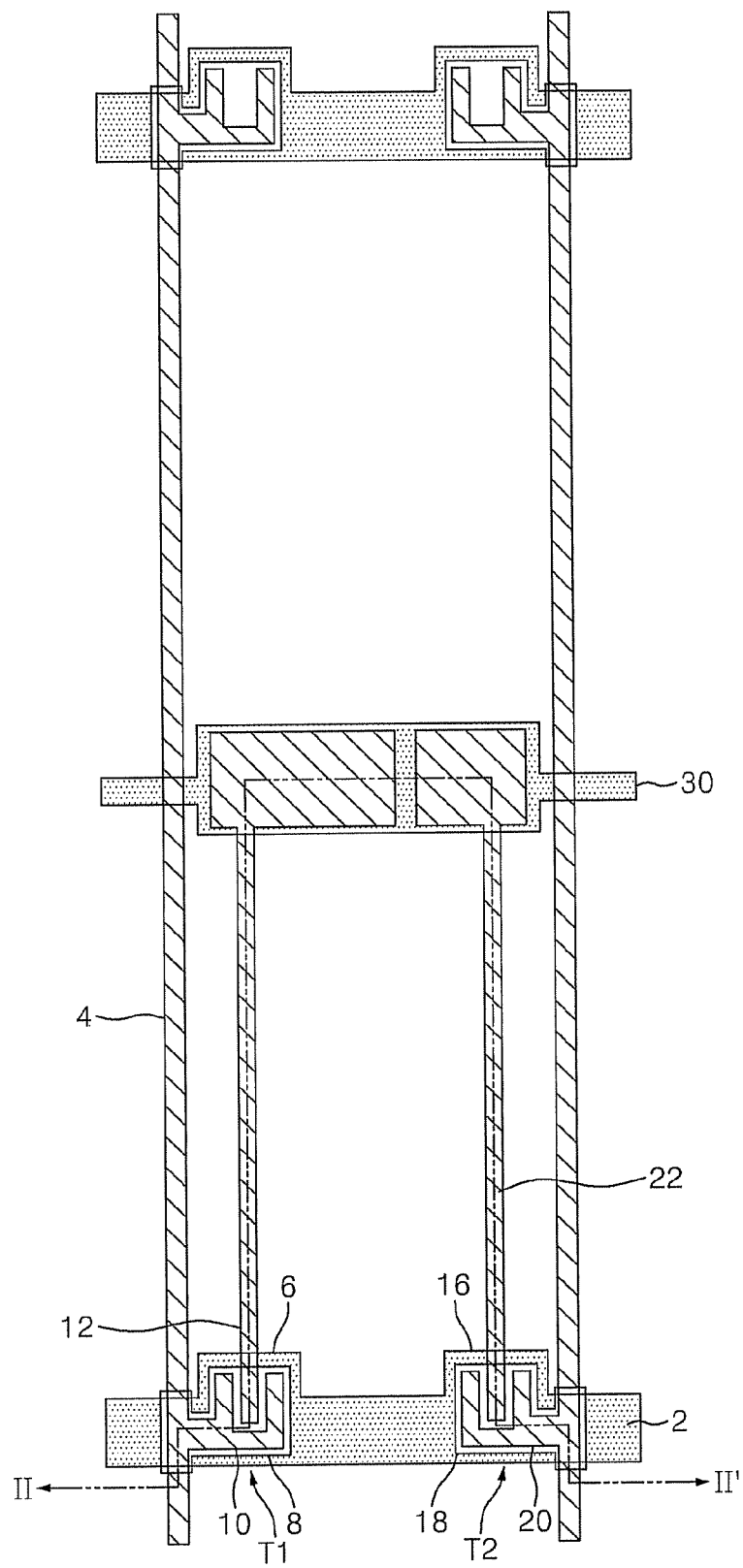
FIGS. 6A and 6B are a top plan view and a cross-sectional view, respectively, for describing an exemplary embodiment of a third mask process of a TFT substrate manufacturing method according to the present invention.
Figure 6B:
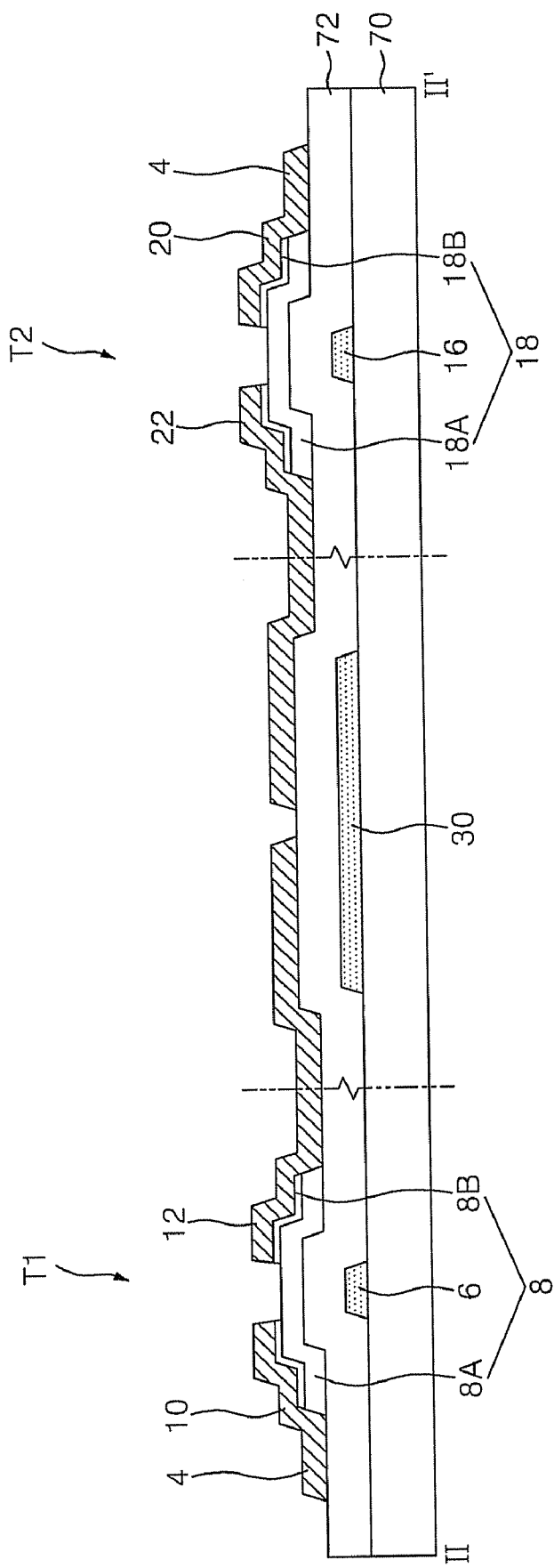

Referring to FIGS. 6A and 6B, a source/drain metal pattern, including the data line 4, the source electrodes 10 and 20 and the drain electrodes 12 and 22, is formed by a third mask process on the gate insulating layer 72 on which the semiconductor layers 8 and 18 are formed. Specifically, a source/drain metal layer is formed by a sputtering method on the gate insulating layer 72 on which the semiconductor layers 8 and 18 are formed. Next, the source/drain metal layer is patterned by photolithographic and etching processes using a third mask (not shown), thus forming the source/drain metal pattern including the data line 4, the source electrodes 10 and 20 and the drain electrodes 12 and 22. Thereafter, the ohmic contact layers 8B and 18B connected to the source electrodes 10 and 20 and to the drain electrodes 12 and 22 are separated by eliminating the ohmic contact layers 8B and 18B exposed between the source electrodes 10 and 20 and the drain electrodes 12 and 22. As a result, the first and second TFTs T1 and T2 connected to the gate line 2 and to the data line 4 are formed. The semiconductor layers 8 and 18 and the source/drain metal pattern may be formed by one mask process using a diffraction exposure mask or a half-tone mask.

Figure 7A:
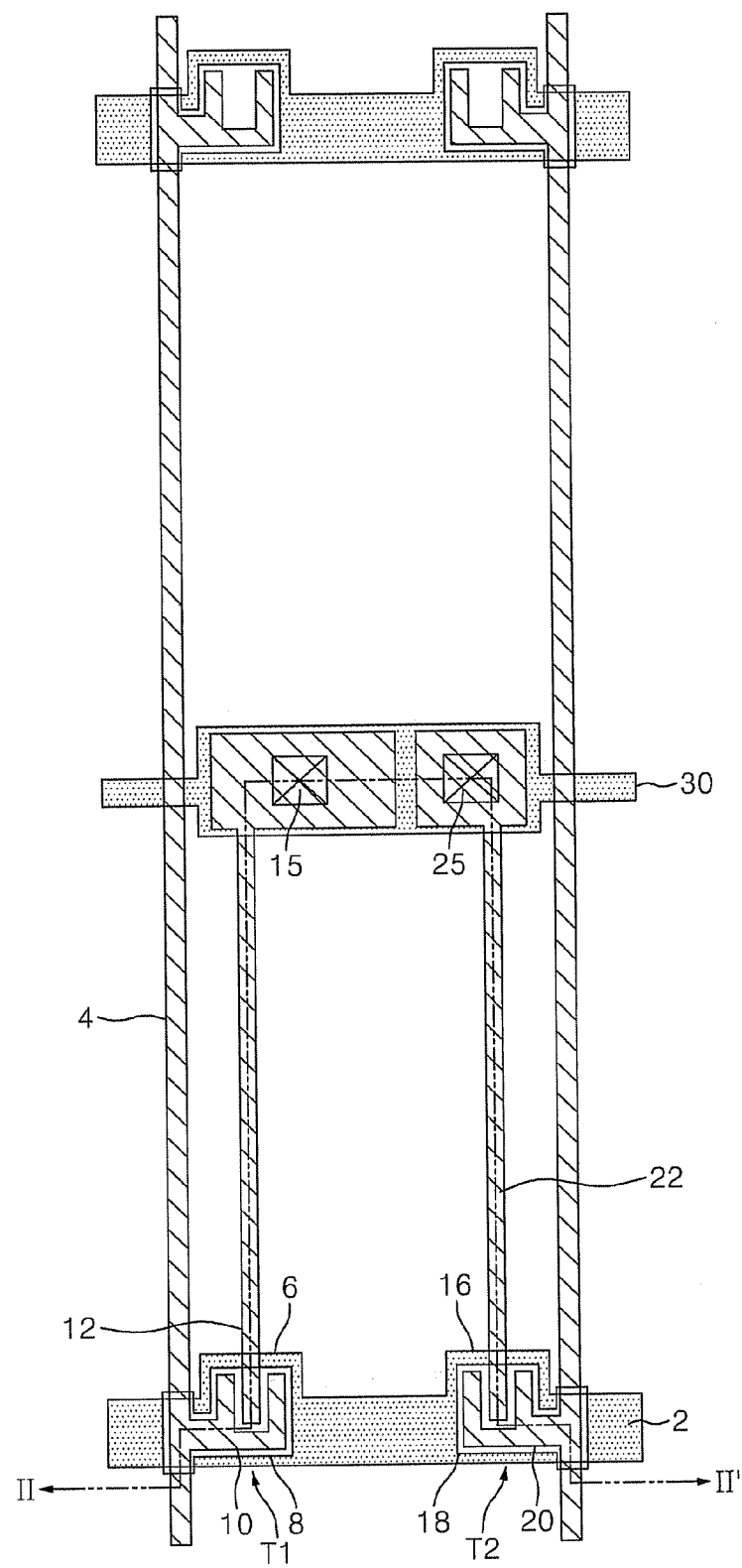
FIGS. 7A and 7B are a top plan view and a cross-sectional view, respectively, for describing an exemplary embodiment of a fourth mask process of a TFT substrate manufacturing method according to the present invention.
Figure 7B:
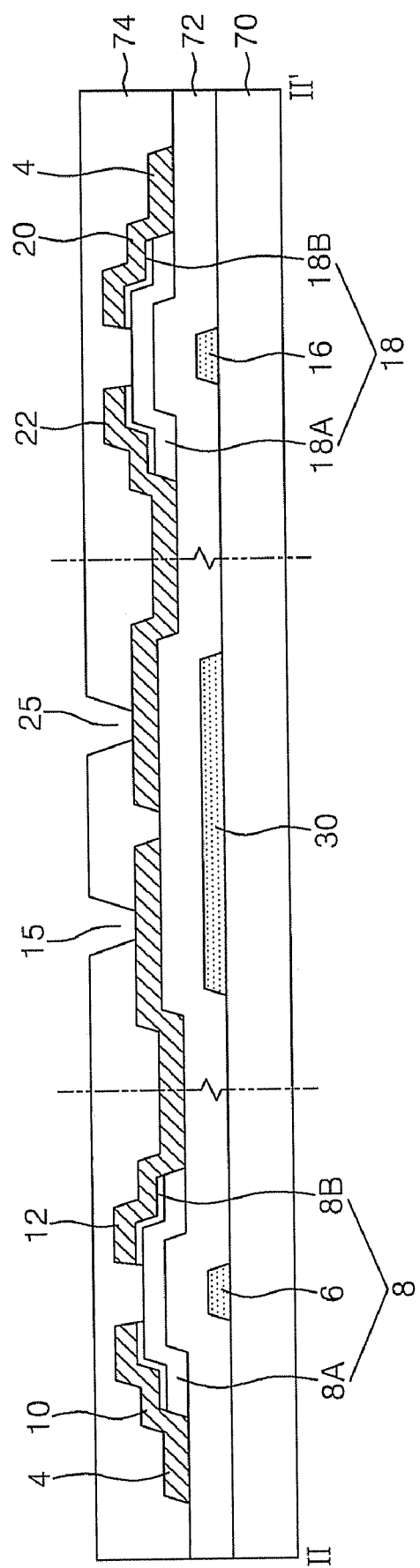

Referring to FIGS. 7A and 7B, the organic insulating layer 74 is formed on the gate insulating layer 72 on which the source/drain metal pattern is formed and the first and second contact holes 15 and 25 penetrating the organic insulating layer 74 are formed by a fourth mask process. Specifically, the organic insulating layer 74 is formed by coating an organic insulating material such as acryl organic compound, benzocyclobutene (BCB) or perfluorocyclobutyl (PFCB) by a spin coating or spinless coating method. Next, the first and second contact holes 15 and 25 respectively exposing the drain electrodes 12 and 22 of the first and second TFTs T1 and T2 by penetrating the organic insulating layer 74 are formed by photolithographic and etching processes using a fourth mask (not shown). Here, an inorganic insulating layer may additionally be formed on and/or under the organic insulating layer 74. At this time, the first and second contact holes 15 and 25 are formed to penetrate the inorganic insulating layer.

Figure 8A:
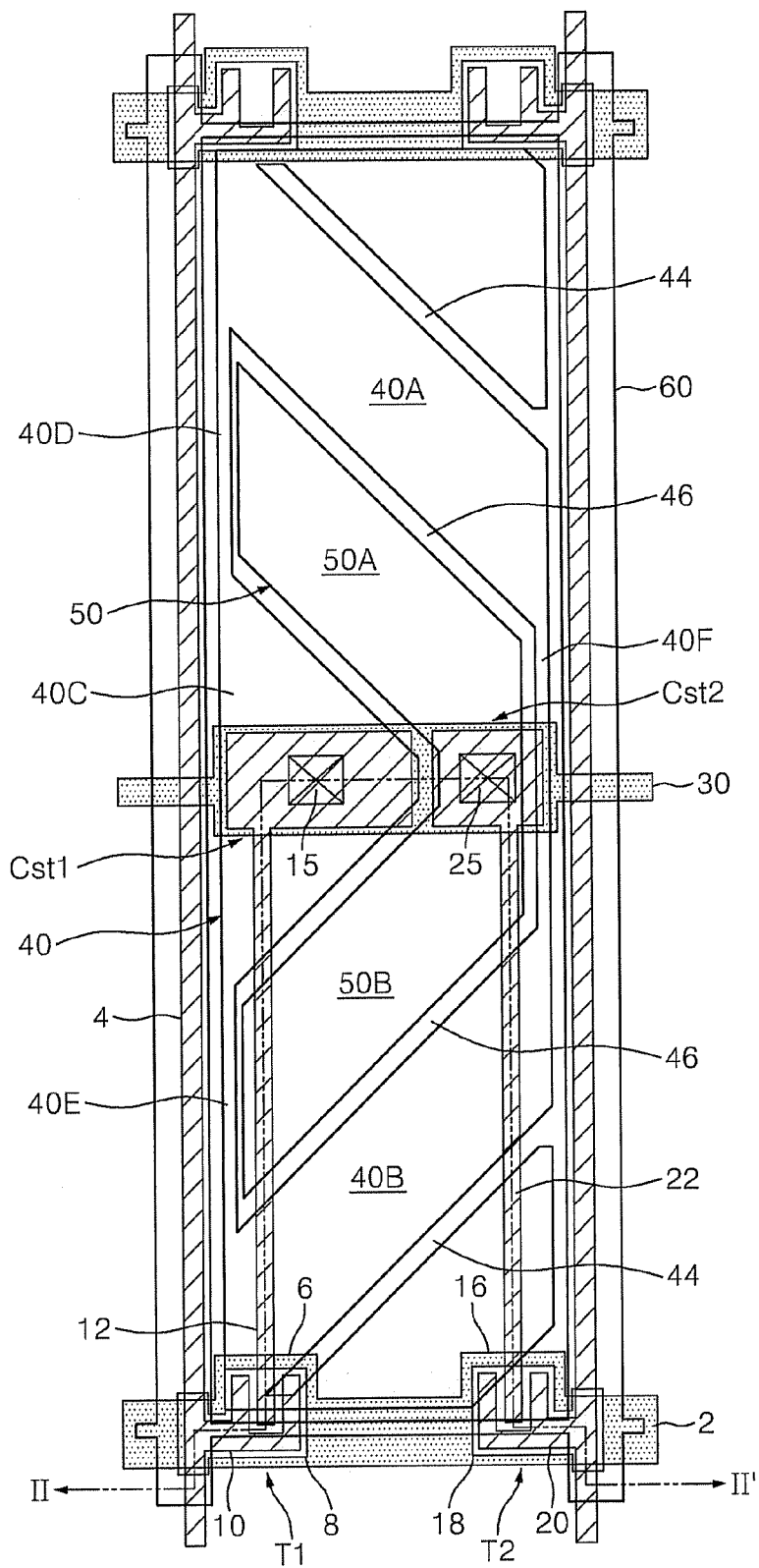
FIGS. 8A and 8B are a top plan view and a cross-sectional view, respectively, for describing an exemplary embodiment of a fifth mask process of a TFT substrate manufacturing method according to the present invention.
Figure 8B:
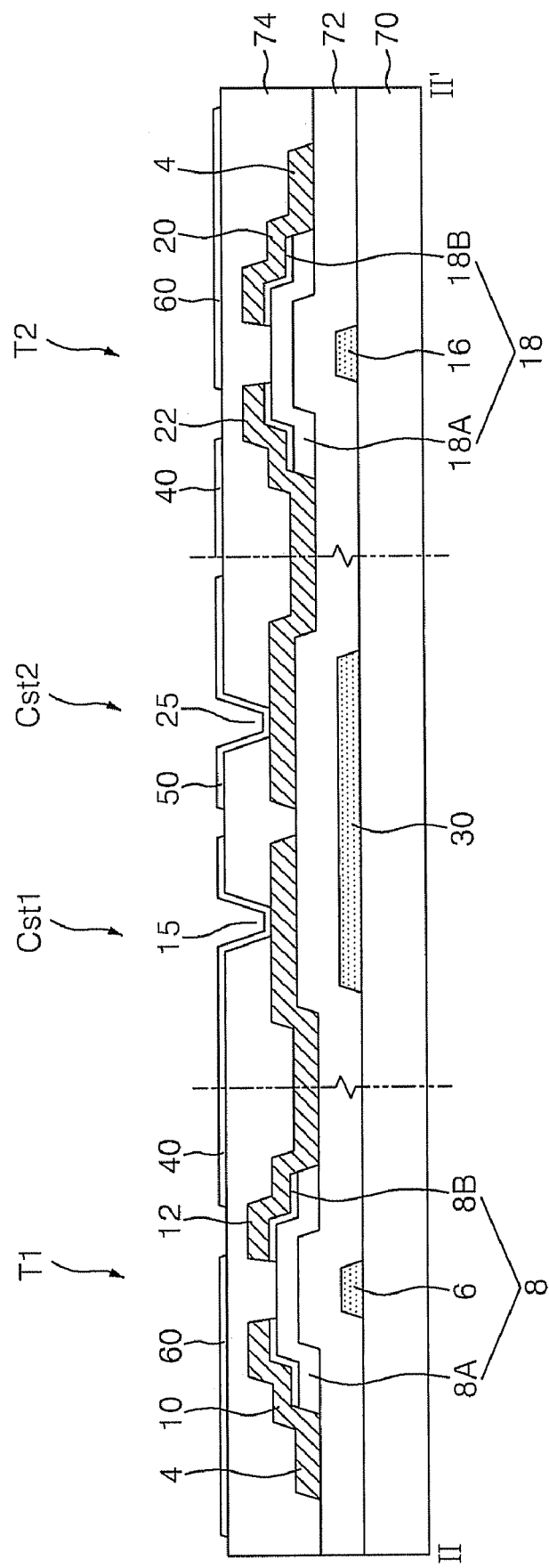

Referring to FIGS. 8A and 8B, a transparent conductive pattern, including the first and second pixel electrodes 40 and 50 and the common line 60, is formed on the organic insulating layer 74 by a fifth mask process. The first and second pixel electrodes 40 and 50 and the common line 60 are formed by depositing a transparent conductive material, such as indium tin oxide (ITO), tin oxide (TO), indium zinc oxide (IZO), or indium tin zinc oxide (ITZO), on the organic insulating layer 74 by a deposition method, such as sputtering, and then patterning them by photolithographic and etching processes using a fifth mask (not shown). The first and second pixel electrodes 40 and 50 are connected to the drain electrodes 12 and 22 of the first and second TFTs T1 and T2 through the first and second contact holes 15 and 25, respectively.

Figure 9:
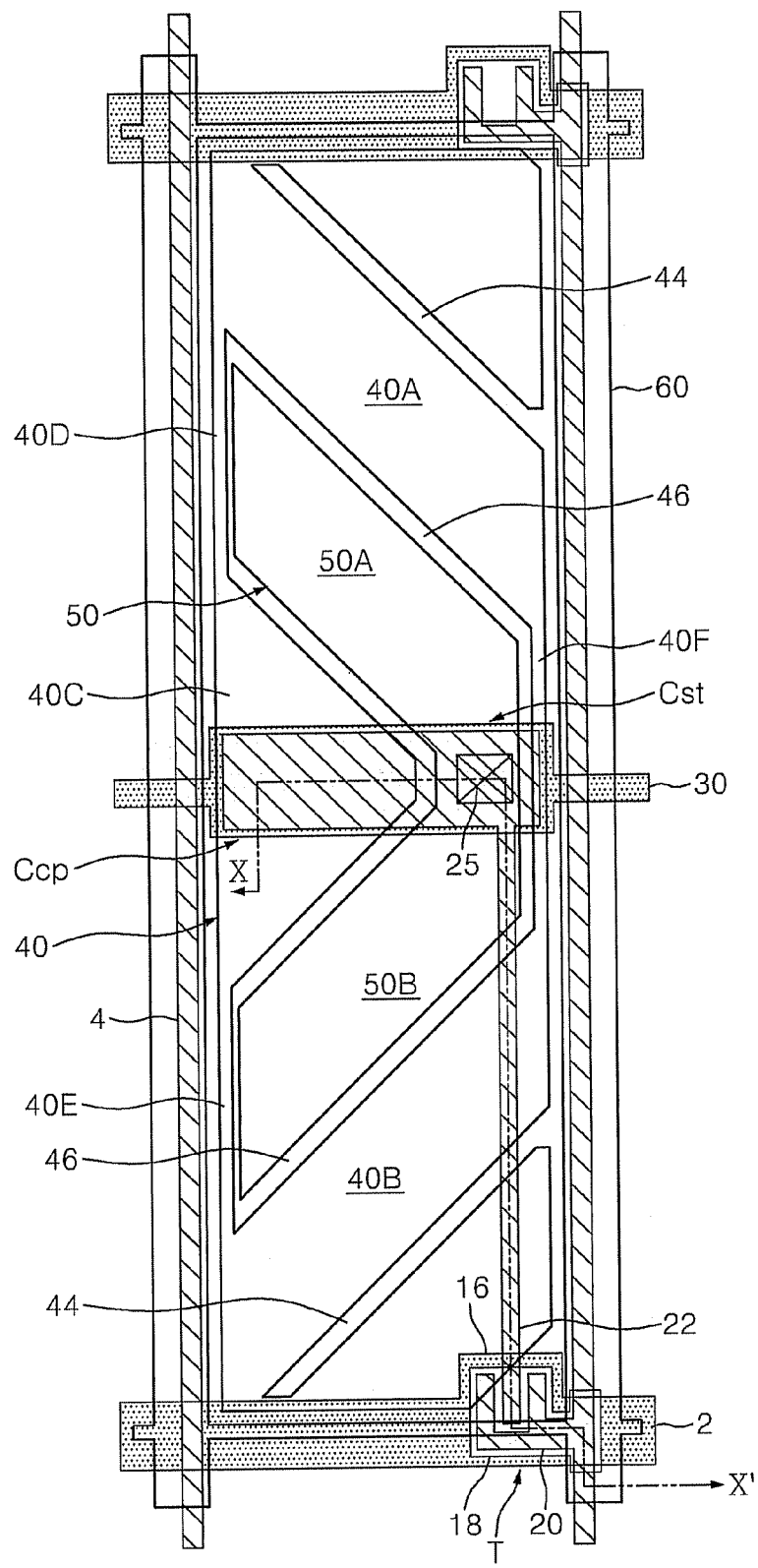
FIG. 9 is a top plan view illustrating a structure of another exemplary embodiment of one subpixel in a TFT substrate of an LCD device according to the present invention.
Figure 10:
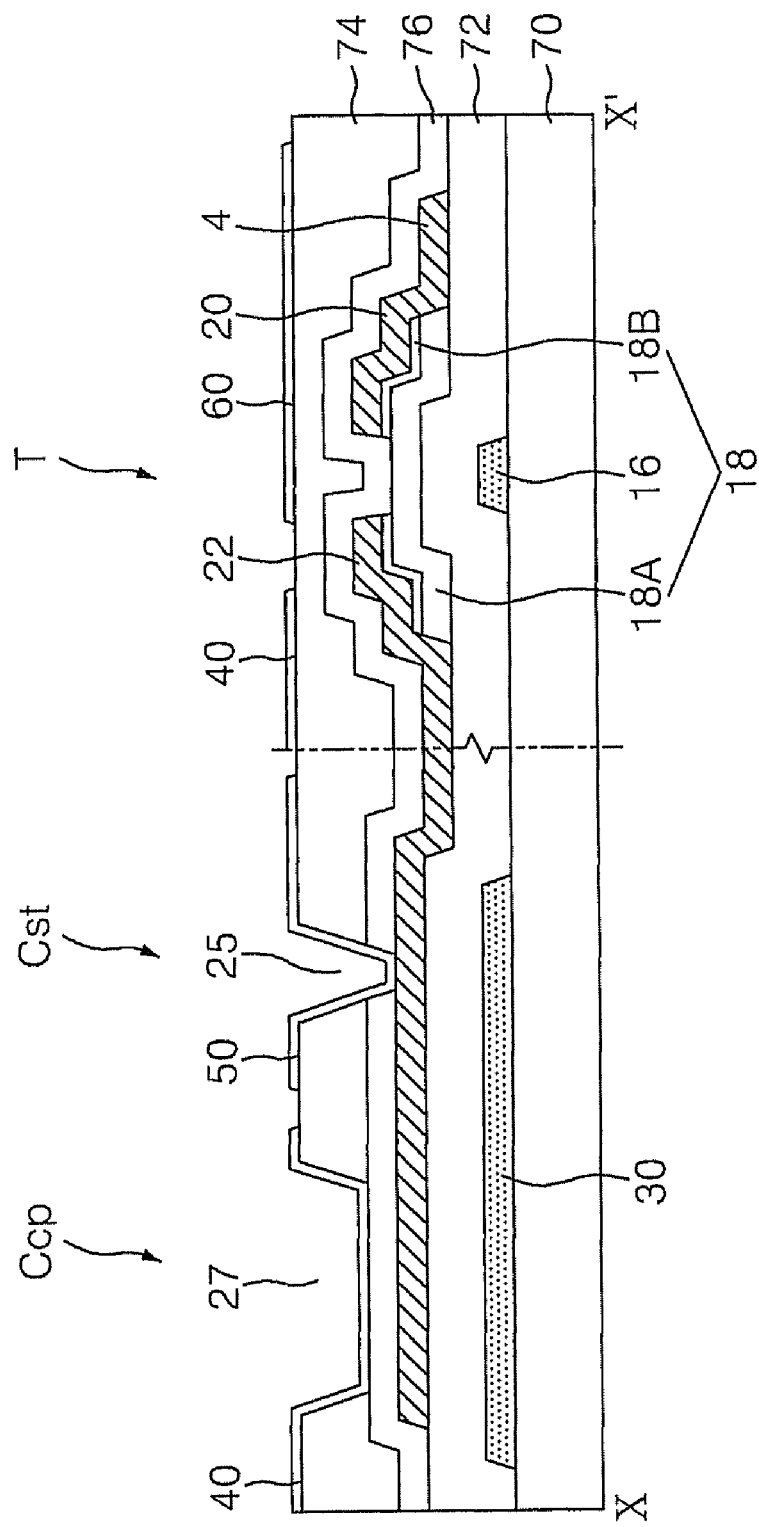
FIG. 10 is a cross-sectional view of taken along line X-X' shown in FIG. 9.

FIG. 9 is a plan view illustrating another exemplary embodiment of one subpixel in a TFT substrate of an LCD device according to the present invention, and FIG. 10 is a cross-sectional view taken along line X-X' of FIG. 9.

Compared to the subpixel shown in FIGS. 1 and 2, the subpixel shown in FIGS. 9 and 10 has the same constituent elements except that the subpixel includes only one TFT T connected to the first pixel electrode 40 and the first pixel electrode 40 forms a coupling capacitor Ccp with the drain electrode 22 of the TFT T. Therefore, a detailed description of the repeated elements will be omitted. The first and second pixel electrodes 40 and 50 shown in FIGS. 1 and 2 receive the different data signals through the first and second TFTs T1 and T2, whereas the first and second pixel electrodes 40 and 50 shown in FIGS. 9 and 10 receive the different data signals through the coupling capacitor Ccp.

The second pixel electrode 50 defining the high gray scale region is connected to the drain electrode 22 of the TFT T through the contact hole 25 penetrating the organic insulating layer 74 and an inorganic insulating layer 76 and receives the data signal from the data line 4 through the TFT T. Since the first pixel electrode 40 defining the low gray scale region forms the coupling capacitor Ccp with the drain electrode 22 and the data signal supplied to the second pixel electrode 50 through the TFT T is received through the coupling capacitor Ccp, the first pixel electrode 40 receives the data signal lower than that supplied to the second pixel electrode 50. Therefore, even if just one TFT T is used, the different data signals can be supplied to the first pixel electrode 40 of the low gray scale region and the second pixel electrode 50 of the high gray scale region.

The coupling capacitor Ccp is formed such that the drain electrode 22 connected to the second pixel electrode 50 extends along the storage line 30 to be overlapped by the first pixel electrode 40 with the inorganic insulating layer 76 disposed therebetween. The inorganic insulating layer 76 is formed between the TFT T and the organic insulating layer 74 to prevent a chemical reaction between the organic insulating layer 74 and the active layer 18A of the TFT T. A capacitor hole 27 penetrating the organic insulating layer 74 is formed to reduce an interval between the first pixel electrode 40 and the drain electrode 22. Therefore, the first pixel electrode 40 overlaps the drain electrode 22 with the inorganic insulating layer 76 of relatively thin thickness disposed therebetween via the capacitor hole 27 and drops the data signal supplied to the drain electrode 22, thus forming the coupling capacitor Ccp capable of sufficiently transmitting the data signal to the first pixel electrode 40.

Since the first pixel electrode 40 of the low gray scale region encompasses the second pixel electrode 50 of the high gray scale region, a deviation of the parasitic capacitances between the first and second pixel electrodes 40 and 50 and the data lines 4 on both sides can be minimized. The length of the left lateral side of the first pixel electrode 40 adjacent to the left data line 4 is nearly identical to that of the right lateral side of the first pixel electrode 40 adjacent to the right data line 4 by the first and second connection electrodes 40D and 40E adjacent to the left data line 4 and by the third connection electrode 40F adjacent to the right data line 4. Moreover, an interval between the second pixel electrode 50 and the left data line 4 is identical to that between the second pixel electrode 50 and the right data line 4 by the first to third connection electrodes 40D, 40E and 40F of the first pixel electrode 40. Hence, the deviation of the left and right parasitic capacitances of the first and second pixel electrodes 40 and 50 and the data lines 4 adjacent thereto on both sides is minimized and thus the vertical crosstalk can be prevented.

A method of manufacturing the TFT substrate shown in FIGS. 9 and 10 is similar to that with reference to FIGS. 4A to 8A and thus a description thereof will be given in brief.

A gate metal pattern, including the gate line 2, the gate electrode 16 connected to the gate line 2, and the storage line 30 parallel with the gate line 2, is formed on the lower insulating substrate 70 by a first mask process. The gate insulating layer 72 is formed by a second mask process on the lower insulating substrate 70 on which the gate metal pattern is formed. A semiconductor layer 18, including the active layer 18A and the ohmic contact layer 18B, is formed on the gate insulating layer 72 overlapping a part of the gate line 2 and the gate electrode 16. A source/drain metal pattern, including the data line 4, the source electrode 20 and the drain electrode 22, is formed by a third mask process on the gate insulating layer 72 on which the semiconductor layer 18 is formed. The semiconductor layer 18 and the source/drain metal pattern may be formed by one mask process using a diffraction exposure mask or a half-tone mask. The inorganic insulating layer 76 having the contact hole 25 exposing the drain electrode 22 is formed by a fourth mask process on the gate insulating layer 72 on which the source/drain metal pattern is formed. The contact hole 25 is extended and the organic insulating layer 74 having the capacitor hole 27 is formed on the inorganic insulating layer 76 by a fifth mask process. A transparent conductive pattern, including the first and second pixel electrodes 40 and 50 and the common line 60, is formed on the organic insulating layer 74 by a sixth mask process.

As is apparent from the foregoing description, the LCD device and manufacturing method thereof minimize a deviation of parasitic capacitances between the first and second pixel electrodes and the data lines on both sides by causing the first pixel electrode of the low gray scale region to encompass the second pixel electrode of the high gray scale region, thereby preventing the vertical crosstalk.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A display device, comprising:
   a plurality of subpixel regions, each subpixel region divided into first and second gray scale regions;
   a first pixel electrode formed in the first gray scale region; and
   a second pixel electrode formed in the second gray scale region separated from the first pixel electrode and encompassed by the first pixel electrode,
   wherein the second pixel electrode includes wings symmetrically slanted about a short side direction of the subpixel region.

2. The display device of claim 1, further comprising:
   a first thin film transistor connected to the first pixel electrode;
   a second thin film transistor connected to the second pixel electrode; and
   a gate line and a data line connected to the first and second thin film transistors, for defining each subpixel region.

3. The display device of claim 2, wherein the first pixel electrode comprises:
   an upper electrode formed at an upper part of the second pixel electrode;
   a lower electrode formed at a lower part of the second pixel electrode;
   a center electrode formed between the wings of the second pixel electrode;
   a first connection line connecting the upper electrode to the center electrode;
   a second connection line connecting the lower electrode to the center electrode; and
   a third connection line for connecting the upper and lower electrodes to each other.

4. The display device of claim 3, further comprising a first slit separating the first and second pixel electrodes from each other.

5. The display device of claim 4, wherein the first slit has a given width along a lateral side of the second pixel electrode and the first slit encompasses the second pixel electrode.

6. The display device of claim 4, further comprising second slits formed at the upper and lower electrodes of the first pixel electrode, the second slits in parallel with the first slit.

7. The display device of claim 3, wherein the first and second connection electrodes of the first pixel electrode are formed between the second pixel electrode and a data line adjacent to one side of the second pixel electrode, and the third connection electrode is formed between the second pixel electrode and a data line adjacent to the other side of the second pixel electrode.

8. The display device of claim 7, wherein the third connection electrode reduces the difference in length between one lateral side of the first pixel electrode adjacent to a data line on one side and the other lateral side of the first pixel electrode adjacent to a data line on the other side.

9. The display device of claim 7, wherein an interval between one side of the second pixel electrode and the adjacent data line is identical to that between the other side of the second pixel electrode and the adjacent data line.

10. The display device of claim 3, further comprising a storage line formed along a short side direction of the subpixel region and overlapped by the first and second pixel electrodes.

11. The display device of claim 10, further comprising:
    a first storage capacitor formed such that a first drain electrode extending from the first thin film transistor and connected to the first pixel electrode overlaps the storage line with an insulating layer disposed therebetween; and
    a second storage capacitor formed such that a second drain electrode extending from the second thin film transistor and connected to the second pixel electrode overlaps the storage line with the insulating layer disposed therebetween.

12. The display device of claim 10, further comprising:
    an organic insulating layer covering the first and second thin film transistors, formed under the first and second pixel electrodes; and
    a common line formed on the organic insulating layer and overlapped by the gate line and the data line.

13. The device of claim 1, further comprising:
    a thin film transistor connected to the second pixel electrode;
    a coupling capacitor formed at an overlapping part of a drain electrode of the thin film transistor and the first pixel electrode; and
    a gate line and a data line connected to the thin film transistor, for defining each subpixel region.

14. The display device of claim 13, wherein the first pixel electrode comprises:
    an upper electrode formed at an upper part of the second pixel electrode;
    a lower electrode formed at a lower part of the second pixel electrode;
    a center electrode formed between the wings of the second pixel electrode;
    a first connection line connecting the upper electrode to the center electrode;
    a second connection line connecting the lower electrode to the center electrode; and
    a third connection line for connecting the upper and lower electrodes to each other.

15. The display device of claim 14, further comprising a storage line formed along a short side direction of the subpixel region and overlapped by the first and second pixel electrodes.

16. The display device of claim 15, further comprising a storage capacitor formed such that the drain electrode extending from the thin film transistor and connected to the second pixel electrode overlaps the storage line with a first insulating layer disposed therebetween, wherein the coupling capacitor is formed such that the drain electrode extending from the thin film transistor is overlapped by the first pixel electrode with a second insulating layer disposed therebetween.

17. A method of manufacturing a display device, the method comprising:
dividing each subpixel region of a plurality of subpixel regions into first and second gray scale regions;
forming a first pixel electrode formed in the first gray scale region of each subpixel region; and
forming a second pixel electrode formed in second gray scale region separated from the first pixel electrode and encompassed by the first pixel electrode,
wherein the second pixel electrode includes wings symmetrically slanted relative to a short side direction of the subpixel region.

18. The method of claim 17, further comprising forming a first thin film transistor connected to the first pixel electrode, a second thin film transistor connected to the second pixel electrode, and a gate line and a data line connected to the first and second thin film transistors, for defining each subpixel region.

19. The method of claim 17, further comprising forming a thin film transistor connected to the second pixel electrode, a coupling capacitor formed at an overlapping part of a drain electrode of the thin film transistor and the first pixel electrode, and a gate line and a data line connected to the thin film transistor, for defining each subpixel region.

20. The method of 17, wherein the first pixel electrode comprises an upper electrode formed at an upper part of the second pixel electrode, a lower electrode formed at a lower part of the second pixel electrode, a center electrode formed between the wings of the second pixel electrode, a first connection line for connecting the upper electrode to the center electrode, a second connection line for connecting the lower electrode to the center electrode, and a third connection line for connecting the upper and lower electrodes to each other.

21. The method of claim 20, further comprising forming a first slit separating the first and second pixel electrodes from each other, wherein the first slit has a given width along a lateral side of the second pixel electrode and is separated from the second pixel electrode by the first slit encompassing the second pixel electrode.

22. The method of claim 21, further comprising forming second slits at the upper and lower electrodes of the first pixel electrode in parallel with the first slit.

23. The method of claim 20, wherein the first and second connection electrodes of the first pixel electrode are formed between the second pixel electrode and a data line adjacent to one side of the second pixel electrode, and the third connection electrode is formed between the second pixel electrode and a data line adjacent to the other side of the second pixel electrode.

24. The method of claim 20, further comprising forming a storage line formed along a short side direction of the subpixel region and overlapped by the first and second pixel electrodes.

25. The method of claim 24, further comprising:
forming a first storage capacitor by overlapping the storage line with a first drain electrode extending from the first thin film transistor and connected to the first pixel electrode with an insulating layer disposed therebetween; and
forming a second storage capacitor by overlapping the storage line with a second drain electrode extending from the second thin film transistor and connected to the second pixel electrode with the insulating layer disposed therebetween.

26. The method of claim 24, further comprising forming a storage capacitor by overlapping the storage line with the drain electrode extending from the thin film transistor and connected to the second pixel electrode with a first insulating layer disposed therebetween, wherein the coupling capacitor is formed such that the drain electrode extending from the thin film transistor is overlapped by the first pixel electrode with a second insulating layer disposed therebetween.

27. The method of claim 24, further comprising forming a common line overlapping the gate line and the data line with the insulating layer disposed therebetween.

* * * * *